D. H. JONES.
Means for Supplying Water to Wash-Stands on Cars.
No. 212,385. Patented Feb. 18, 1879.
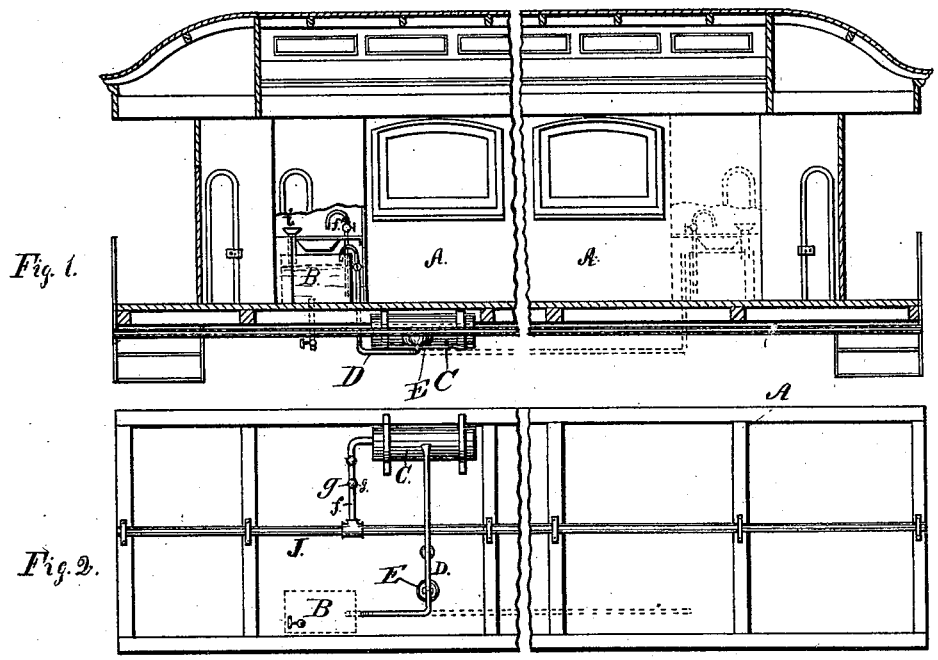
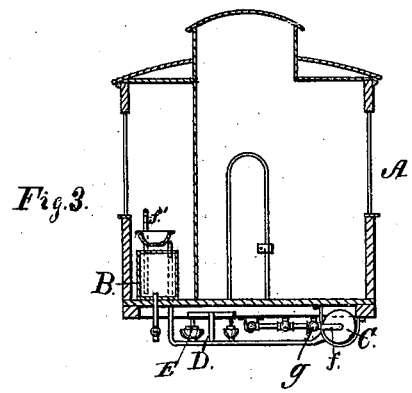
Witnesses
Donn P. Twitchell.
Will W. Dodge.
Inventor
D. H. Jones.
By his attys.
Dodger & Son

UNITED STATES PATENT OFFICE.

DAVID H. JONES, OF BELLEVEAUE, PENNSYLVANIA.

IMPROVEMENT IN MEANS FOR SUPPLYING WATER TO WASH-STANDS ON CARS.

Specification forming part of Letters Patent No. 212,385, dated February 18, 1879; application filed January 6, 1879.

*To all whom it may concern:*

Be it known that I, DAVID H. JONES, of Belleveaue, in the county of Allegheny and State of Pennsylvania, have invented certain Improvements in Means for Supplying Water to Wash-Stands on Railroad-Cars, of which the following is a specification:

The object of this invention is to avoid the use of the hand-pumps used in railroad-cars to deliver water into the wash-basin from the reservoir below; and to this end it consists in applying to those cars which are provided with air-brakes an air receiver and conductors so arranged that when air is admitted to the brake it will also enter and be confined within the receiver, whence it is conducted and applied to force the water from its reservoir into the basin when the water-cock is opened. The air-receiver may be a space or chamber in the upper part of the water-reservoir; but it is preferred to employ a special and separate air-receiver, as hereinafter described.

Figure 1 represents a longitudinal vertical section of a car with my improvements applied; Fig. 2, a bottom-plan view of the same; Fig. 3 a cross-section of the same.

A represents the body of the car; B, a tight water-reservoir, located preferably beneath the wash-basin, as shown; C, an air chamber or reservoir, arranged below the car, and connected, first, by a pipe, D, to the top of the water-reservoir, and, second, by a pipe, $f$, to the pipe J, which supplies air to the brake-cylinder. The pipe $f$ is provided with one or more check-valves, $g$, to prevent the escape of the air again when the brakes are relieved; and the pipe D is provided with an automatic governor or regulator, E, of any suitable construction to secure a uniform pressure of the air passing into the water-reservoir.

The governor or regulator is employed in order to prevent the air, when the reservoir is highly charged, from driving the water out violently, so as to cause it to be driven from the basin. The governor must be of such construction that it will render the discharge of the water practically uniform regardless of the frequently-changing pressure of the air. A simple form of governor—and, perhaps, all things considered, the best that can be used— is that known as "Burnett's Patent Governor," consisting of a lever provided at its two ends with diaphragms or pistons of different sizes, the larger exposed to the full pressure of the fluid, and the latter controlling a valve through which the fluid must pass.

A pipe, $f'$, extends downward from above the basin into and nearly to the bottom of the water-reservoir, and is provided at the upper end with a cock or valve. A plug, $i$, the upper end of which is fashioned into a soap-dish, has its lower end screwed into the top of the water-reservoir, and when unscrewed admits of the reservoir being filled.

The reservoir B being filled with water, the action of the apparatus is as follows: When air is admitted to apply the car-brake it also passes to and fills the receiver C, whence it passes into the upper part of the water-reservoir B, so as to exert a downward pressure upon the water. As soon as the pipe $f'$ is opened the expansion of the air forces the water through the pipe into the basin. The receiver C is made of such size that without being refilled it will cause the water to fill the basin many times. Whenever the brake is applied the air-receiver is, of course, refilled, and thus a delivery of the water at all times is insured, as there is no danger of the supply of air in the receiver becoming exhausted.

The essential feature of the invention is the transmission of air from the brake mechanism, which may be of the ordinary Westinghouse system, to the water-reservoir, for the purpose of delivering the water therefrom, and it is manifest that the apparatus may be modified in its details, as desired.

Two or more wash-stands may be supplied with water by air from the one receiver. By the application of the air, as described, I am enabled to dispense with the hand-pumps usually employed and to avoid the labor and annoyance incident to their use; but the hand-pump for forcing air into the receiver may be provided for use in cases of emergency. An air-cock should be applied between the air-receiver and water-reservoir to retain the air when filling the reservoir.

Having described my invention, what I claim is—

1. In combination with a railway-car having an air-brake, a wash-stand, a water-reservoir having a delivery-pipe to the stand, and air-conducting devices connecting the water-reservoir with the air-supplying devices of the brake, whereby the air from the brake mechanism is caused to deliver the water from the reservoir to the basin.

2. In combination with a railway-car, the wash-basin, water-reservoir B, air reservoir or receiver C, connected with the brake mechanism, and a check-valve, $g$, applied between the brake mechanism and receiver.

3. The combination and arrangement, as shown and described, of the following elements: the wash-basin, closed water-reservoir B, provided with filling-valve $i$, pipe $f$, with cock thereon, air-receiver C, and pipe D, provided with a regulator, E, and a shut-off valve.

DAVID H. JONES.

Witnesses:
 P. T. DODGE,
 JAMES E. WAUGH.